United States Patent [19]
Koyama et al.

[11] Patent Number: 6,136,895
[45] Date of Patent: Oct. 24, 2000

[54] CATIONIC ELECTROCOATING COMPOSITION

[75] Inventors: Toshitaka Koyama, Yokohama; Takahiro Mukae, Yawata; Shinji Nakano, Takatsuki; Mitsuo Yamada, Suita, all of Japan

[73] Assignee: Nippon Paint Co., Ltd., Osaka-fu, Japan

[21] Appl. No.: 09/339,834

[22] Filed: Jun. 25, 1999

[30] Foreign Application Priority Data

Jun. 25, 1998 [JP] Japan .................................. 10-178573

[51] Int. Cl.[7] ............................... C08K 3/20; C08L 63/02
[52] U.S. Cl. ......................... 523/411; 204/489; 204/504; 523/407; 523/409; 523/412; 523/414
[58] Field of Search ..................................... 523/406, 407, 523/409, 411, 412, 414; 204/489, 504

[56] References Cited

U.S. PATENT DOCUMENTS 6,054,033  4/2000  Hunakoshi et al. ..................... 204/501

*Primary Examiner*—Robert Dawson
*Assistant Examiner*—D. Aylward
*Attorney, Agent, or Firm*—Wenderoth, Lind & Ponack, L.L.P.

[57] ABSTRACT

The present invention can provide a cationic electrocoating composition, comprising:

(a) an acrylic resin functioning as a leveling agent, which has both an amino group and an acid group in one molecule and has a hydroxyl value of 50 to 200, (b) a base resin, and (c) a crosslinking agent, wherein the acrylic resin (a) is formulated in an amount of 0.1 to 20 percent by weight, based on the total weight of a mixture of the base resin (b) and the crosslinking agent (c), and the cationic electrocoating composition is substantially free from lead compound. The present invention also provides a method for preventing cratering or cissing on an electrocoated film formed from the cationic electrocoating composition.

13 Claims, No Drawings

CATIONIC ELECTROCOATING COMPOSITION

FIELD OF THE INVENTION

The present invention is related to a novel cationic electrocoating composition. In particular, the present invention is related to the cationic electrocoating composition substantially free from lead compounds, which comprises a leveling agent having both acid and basic groups in one molecule. The cationic electrocoating composition has excellent characteristics, for example good surface smoothness, increased resistance to cratering or cissing and resistance to pinhole, good throwing power and workability, and improved adhesion properties with sealer coatings and top coatings, and the like.

BACKGROUND OF THE INVENTION

A cationic electrodeposition paint has been widely employed in automobile industry as a primer for automotive bodies, because of good corrosion resistance.

The cationic electrodeposition paint is typically an aqueous dispersion which is prepared by dispersing a vehicle component consisting of a cationic resin (e.g. amine-modified epoxy resin, and the like) and a curing agent or a crosslinking agent (e.g. blocked polyisocyanate, and the like) with a pigment paste which contains pigment dispersed in a pigment dispersing resin, in an aqueous medium. Cationic electrodeposition is generally conducted by preparing an electrodeposition bath using the above mentioned electrocoating composition, putting an article to be coated therein and applying electric current as the article being cathode to deposit an electrocoated film on the surface of the article, followed by heating to cure the film.

It is desired that the resulting cationic electrocoated film has good surface smoothness without surface defects such as cratering and cissing, and the like, and also has sufficient adhesion when applying an intermediate coating and/or a top coating thereon, which does not adversely affect on smoothness and gloss of the top coating.

It is believed that the surface defects are caused by an organic compound showing low surface tension, an impurity in the pigment, a dust in an oven employed during the baking process or an oil sputtered from a seam of the automotive bodies, etc. Particularly, the oil may bump during the baking process to form craters on the surface of the coating. Problems referred to cratering or cissing would be eliminated if origins of contamination such as the dust are removed from the surface of the coating. However, it is significantly difficult to industrially carry out the above elimination.

Many approaches to prevent the surface defects had been suggested, including, for example, increasing a weight ratio of the pigment/base resin in the cationic electrodeposition paint or polymerizing the base resin to reduce flowability of the coating during the baking. These approaches, however, had disadvantages, such as poor smoothness of the resulting coating, which had been caused by the increase of a viscosity of the paint.

In order to prevent the above surface defects on the coating, the electrocoating composition generally contains lead compound. It is known that the lead compound melts during the baking process after coating the paint and accelerates curing of the base resin with a crosslinking agent, which makes smooth curing possible. However, since the lead compound may cause environment pollution when producing and/or wasting the paint after used, there has been recently desired a paint free from the lead compound.

For obtaining a cationic elecrocoating composition which does not contain the lead compound, an additive for inhibiting craters (such as cissing inhibiting agent, leveling agent or anti-crater agent, having the same function) has been reported. Examples of the additive include one that is formed from polyoxyalkylenepolyamines as described in Japanese Patent Kokai Publication No. Hei 2 (1990)-4826 and fluorine-containing copolymers as described in Japanese Patent Kokai Publication No. Hei 6 (1994)-184471, and the like.

The additive, however, when adding in an amount enough to inhibit cratering or cissing, may increase the viscosity of the electrocoating composition or reduce adhesion with PVC sealer, an intermediate coating or a top coating.

OBJECTS OF THE INVENTION

The object of the present invention is to provide a cationic electrocoating composition substantially free from the lead compound, showing both improved resistance to cratering or cissing and excellent adhesion with intermediate and/or top coating(s) formed thereon.

DEFINITION OF TERMS

In the present invention, the term "leveling agent" formulated in the cationic electrocoating composition means a surface controlling agent added to inhibit surface defects on the coating formed from the coating composition, such as a crater and cissing, and the like. The languages "substantially free from lead compound" define as that the cationic electrocoating composition according to the present invention contains no lead compound, or if any, contains lead compound in a lead ion concentration of 800 ppm or less, preferably 500 ppm or less, in a diluted coating composition which is charged in an electrodeposition bath. If the lead ion concentration in the coating composition of the present invention is more, the lead ion may not only result in damaging environment but also deteriorate surface smoothness of the coating.

Herein, the term "amine value" means number of amino groups contained in a cationic resin in the coating composition of the present invention and can be given in a weight (in milligram) of potassium hydroxide equal molar value to a molar value of amino groups contained in one gram of the cationic resin.

SUMMARY OF THE INVENTION

The present invention provides a cationic electrocoating composition, comprising:
(a) an acrylic resin functioning as a leveling agent, which has both an amino group and an acid group in one molecule and has a hydroxyl value of 50 to 200,
(b) a base resin, and
(c) a crosslinking agent,
wherein the acrylic resin (a) is formulated in an amount of 0.1 to 20 percent by weight, based on the total weight of a mixture of the base resin (b) and the crosslinking agent (c), and the cationic electrocoating composition is substantially free from lead compound. Alternately, the present invention provides a cationic electrocoating composition, comprising:
(a') an acrylic resin functioning as a leveling agent, which has both an amino group and an acid group in one molecule and has a hydroxyl value of 50 to 200, an amine value of 15 to 150 and an acid value of 5 to 15, (b) a base resin, and (c) a crosslinking agent, wherein the acrylic resin (a') is formulated in an amount of 0.1 to 20 percent by weight, based on the total weight of a mixture of the base resin (b) and the crosslinking agent (c), and the cationic electrocoating composition is substantially free from lead compound. The present invention also provides a method for preventing cratering or cissing on an electrocoated film formed from the cationic electrocoating composition.

DETAILED DESCRIPTION OF THE PREFERRED EMBODIMENTS (a) or (a') Acrylic resin

In the first embodiment, the cationic electrocoating composition according to the present invention contains a modified acrylic resin (a) having both an amino group and an acid group in one molecule and functioning as the leveling agent. An equivalent ratio of amino group: acid group contained in the acrylic resin (a) may be 1:1 to 30:1.

The amino group contained in the acrylic resin (a) may be any one selected from a primary amino, a secondary amino, a tertiary amino group, or a combination thereof. Introducing the amino group to the acrylic resin (a) can be accomplished by homo- or co-polymerizing an acrylate monomer(s) selected from the group consisting of N,N-dimethylaminoethyl methacrylate, N,N-diethylaminoethyl methacrylate, N,N-dimethylaminopropyl methacrylate and N,N-diethylaminopropyl methacrylate.

The amino group can be also introduced to the acrylic resin (a) by reacting an epoxy group in the acrylic resin (a) with a secondary amine. This may be carried out by homo- or co-polymerizing the epoxy group-containing monomers, such as glycidyl (meth)acrylate, etc., and then reacting the epoxy group contained therein with the secondary amine. This can have the substantially similar effect to the method which glycidyl (meth)acrylate is reacted with the amines to synthesize amine-addition monomers, and then polymerize them. Examples of a secondary amine usually used in the reaction with epoxy group include diethylamine, dibutylamine, dicyclohexylamine, morpholine, diethanolamine, N-methylethanolamine, and the like. Especially, the amines having both a hydroxyl group and a secondary amino group in one molecule is preferable. Methyl-isobutylketone diketiminate of diethylenetriamine, methyl-isobutylketone monoketiminate of 2-(2-aminoethylamino)ethanol, and the like, can be employed.

In this case, the above amines are stoichiometrically reacted with the epoxy group in the acrylic resin.

In the present invention, the acid group contained in the acrylic resin (a) can be selected from the group consisting of a carboxyl, a phosphate and sulfonate groups. Introducing the above acid group to the acrylic resin (a) can be accomplished by reacting the acrylic resin with an initiator selected from the group consisting of 4,4'-azo-bis-4-cyanovaleric acid, dimetyl 2,2'-azo-bis-isobutyrate, t-butylperoxymaleic acid and succinic peroxide; and/or a monomer selected from the group consisting of an acrylic acid, a methacrylic acid, a phosphate and a sulfonic acid.

Introduction of the amino groups and acid groups to the acrylic resin (a) acting as the leveling agent used in the present invention can be conducted by mixing the amino group-containing acrylate monomer with the initiator and/or the monomer abovementioned preferably at a temperature of 50 to 170° C., more preferably at 80 to 150° C. This reaction may be carried out in a suitable solvent selected from aromatic hydrocarbons such as toluene, xylene, etc.; ketones such as cyclohexanone, isophorone, methyl isobutyl ketone, etc.; esters such as ethyl acetate, butyl acetate, etc.; alcohols such as n-butanol, methoxypropanol, etc.; ethers such as ethylcellosolve, butylcellosolve, diethylene glycol monobutyl ether, etc.; and a combination thereof. Preferably, the reaction can be conducted in the presence of an inert gas, e.g. nitrogen, etc.

The resulting acrylic resin (a) acting as the leveling agent, which the amino group and the acid group in one molecule are introduced by the method mentioned above, may preferably have a number average molecular weight of 1,000 to 50,000, a hydroxyl value of 50 to 200 and an acid value of 5 to 15. When the hydroxyl value of the acrylic resin is less than 50, adhesion of the electrocoatings with PVC sealer and/or a top coating formed thereon is poor. When the hydroxyl value is above 200, the appearance, water-resistant and corrosion resistance of the electrocoatings may be lowered.

In the second embodiment of the present invention, the cationic electrocoating composition can also contain the acrylic resin (a') having the amine vale of 15 to 150, as well as the hydroxyl value and the acid value defined above, as the leveling agent.

The cationic electrocoating composition according to the present invention is an aqueous dispersion which is prepared by dispersing the leveling agent (a) (that is the distinguished component in the present invention), a vehicle component composed of the cationic resin as the base resin (b), the blocked polyisocyanate as the crosslinking agent (c) and if necessary, a pigment paste (D) containing the pigment dispersed with a pigment dispersing resin, in an aqueous media.

In the present invention, the cationic electrocoating composition can contain the leveling agent (a) or (a') in an amount of 0.1 to 20 percent by weight, preferably 1 to 5 percent by weight, based on the total weight of a mixture of the base resin (b) and the crosslinking agent (c). When the content of the leveling agent (a) or (a') is less than 0.1 percent by weight, the object of the present invention, that is the inhibition effect of cratering or cissing, can not be achieved sufficiently. When the content of the leveling agent is above 20 percent by weight, the corrosion resistance of the coating on an article is poor.

(b) Base resin

The base resin (b) used in the present invention may be any art-known cationic resin. Examples thereof include amine-modified epoxy resins, amine-modified polyurethane polyol resins, amine-modified polybutadiene resins, amine-modified acrylic resins, sulfonium group-containing resins and phosphonium group containing resins. Particularly, amine-modified epoxy resins, that is also called aminated-epoxy resins are preferable.

Most suitable epoxy resin used for the present invention is generally polyepoxide. The polyepoxide generally contains one or more 1,2-epoxy groups in one molecule on the average. The most preferable polyepoxide used for the present invention has an epoxy equivalent of 180 to 1,200, particularly 375 to 1,000.

Examples of the useful polyepoxide include polyglycidyl ether of polyphenol, aliphatic polyol or alicyclic polyol, and the like. The useful polyepoxide can be prepared, for example, by etherifying polyphenols with epichlorohydrin or dichlorohydrin in the presence of an alkali.

An epoxy resin having an oxazolidone ring such as 2-, 4- or 5-oxazolidinyl group can be also employed instead of the above polyepoxide. Introducing an oxazolidinyl group to the epoxy resin can be conducted by, for example, mixing a blocked polyisocyanate blocked with a lower alcohol, such as methanol, with the polyepoxide, heating them in the presence of a basic catalyst, and then distilling off the lower alcohol by-product.

The epoxy resin may be modified with a suitable resin, such as polyester polyol, polyether polyol and monofunctional alkylphenols. Typical examples of the resin used for modifying include polycaprolactondiol, ethyleneoxide addition polymers, and the like.

Examples of a secondary amine employed in amination of the epoxy resin to obtain the amine-modified epoxy resins includes alkanolamine such as n-methylethanolamine, diethanolamine and diisopropanolamine; and alkylamine such as diethylamine and dibutylamine, and the like. Ketimines can be also employed as the secondary amine. Ketimines can be obtained by using polyamines having at least one primary amino group in one molecule, such as diethylenetriamine and aminoethylethanolamine, and blocking the primary amino group with ketones such as methyl isobutyl ketone and methyl ethyl ketone. Two or more of the above mentioned amines may be employed in combination.

Introduction of the amino group to the epoxy resins can be also accomplished by reacting the epoxy group in the epoxy resins with the secondary amine, before or after co-polymerizing the epoxy group-containing monomer.

The base resin (b) mentioned above may be formulated in the cationic electrocoating composition of the present invention in a form of a solution isolated after the above reaction or a solution prepared as it was. In the cationic electrocoating composition, the base resin (b) may be employed alone or in combination.

In the cationic electrocoating composition of the present invention, the base resin (b) can be contained in an amount of 25 to 80 percent by weight, preferably 40 to 70 percent by weight, based on the solid content of the coating composition.

(c) Crosslinking agent

The crosslinking agent (c) contained in the cationic electrocoating composition of the present invention may be a blocked polyisocyanate prepared by reacting a polyisocyanate with a blocking agent. Examples of the polyisocyanate include an aliphatic di- or poly-isocyanate, such as trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidene diisocyanate, butylidene diisocyanate, etc.; an aromatic diisocyanate, such as tolylene diisocyanate (TDI), 4,4'-diphenylmethane diisocyanate (MDI), xylylene diisocyanate (XDI), 1,5-naphthalene diisocyanate, 1,4-naphthalene diisocyanate, etc.; alicyclic diisocyanate, such as 1,3-cyclopentane diisocyanate, 1,4-cyclohexane diisocyanate, 1,2-cyclohexane diisocyanate, isophorone diisocyanate, 2,5- or 2,6-bi-cyclo[2,2,1]heptane-bis-(isocyanatemethyl), etc.

Examples of the blocking agent used for blocking aromatic polyisocyanates include halogenated hydrocarbonic alcohols, such as 1-chloro- 2-propanol, ethylene chlorohydrin, etc; aliphatic or heterocyclic alcohols, such as n-propanol, furfuryl alcohol, alkyl group-substituted furfuryl alcohol, etc.; phenols, such as phenol, m-cresol, p-nitrophenol, p-chlorophenol, nonyl phenol, etc.; oximes, such as methyl ethyl ketoxime, methyl isobutyl ketoxime, acetone oxime, cyclohexane oxime, etc.; active methylene compounds, such as acetyl acetone, ethyl acetoacetate, ethyl malonate, etc.; or caprolactam, and the like. Particularly preferred blocking agent for blocking aromatic polyisocyanate are oximes, phenols and alcohols (e.g. furfuryl alcohol and alkyl group-substituted furfuryl alcohol). To block the aliphatic polyisocyanates, phenols and oximes are preferably employed.

The reaction of polyisocyanate with the blocking agent to prepare desirable blocked polyisocyanates is conducted until the infrared absorption spectra based on the isocyanate group of the polyisocyanates substantially disappears as examined using IR (infrared) spectrum.

The blocked polyisocyanate may be present as a separate component or be integrated with the other component. For example, a half-blocked polyisocyanate can be reacted with the base resin (a) or (a') to increase crosslinking ability of the base resin. Preparation and formulation related to the half-blocked polyisocyanate can be found in U.S. Pat. No. 5,510,400, all of which is incorporated herewith as a reference.

If the electrocoating composition does not contain the blocked polyisocyanate as the crosslinking agent (c), the resulting coated film does not cure sufficiently. The blocked polyisocyanate preferably has a dissociation temperature of 100 to 200° C. If the dissociation temperature of the blocked polyisocyanate is higher than 200° C., the resulting coated film can not be efficiently cured when baking at a temperature generally used for electrocoating. On the other hand, when the dissociation temperature is too low, the flowability of the coated film before curing is poor and the storage stability of the coating composition is lowered.

Examples of a dissociation catalyst accelerating the dissociation of the blocked polyisocyanate employed as the crosslinking agent (c) include organic tin compounds such as dibutyltin laurate, dibutyltin oxide, dioctyltin, etc.; amines such as N-methylmorphorine, etc.; and metal salts such as lead acetate, and strontium salt, cobalt salt, copper salt, etc. The dissociation catalyst can be generally formulated in the cationic electrocoating composition in the concentration of 0.1 to 6 percent by weight, base on the total solid content of the film-forming components in the coating composition.

The pigment dispersing paste (d) can be generally prepared by mixing and dispersing the pigment in a cationic resin as a pigment dispersing resin. Examples of the pigment employed in the present invention include color pigments such as carbon black, black lead, titanium oxide, hydrozincite, etc.; extender pigments such as aluminum silicate, kaolin, etc.; synthesized pigments such as strontium chromate, aluminum phosphomolybdate, etc. Examples of the cationic resin used as the pigment dispersing resin include one that contains onium salts such as a quaternary ammonium salt, a tertiary sulfonium salt, etc.; or one that contains primary amines or tertiary amines, as a cationic group.

The concentration of the pigment formulated in the cationic electrocoating composition may be 1 to 35 percent by weight, preferably 10 to 30 percent by weight, based on the total solid content of the coating composition. The content of the pigment dispersing resin depends on the amount of the pigment and may be 1 to 20 percent by weight, preferably 1 to 15 percent by weight, based on the total solid content of the electrocoating composition.

If necessary, the cationic electrocoating composition can contain various additives and solvents in addition to the above components.

Examples of the additives include acids such as formic acid, acetic acid, lactic acid, sulfamic acid, etc., surfactants, and if necessary, UV absorbent, a defoaming agent, etc., which are art-known for employing in the cationic electrocoating composition. The acids may be one that can be used as a neutralizer when preparing the vehicle component by dispersing the base resin (b) and the crosslinking agent (c) in the aqueous medium. Particularly, the acids may be formulated in the coating composition in such an amount to neutralize at least 20 percent, preferably 25 to 60 percent, of the basic component contained in the coating composition.

For the cationic electrocoating composition of the present invention, the aqueous medium employed for dispersing the above components may contain various organic solvents to dissolve the resin and to adjust the viscosity of the coating composition, in addition to water. Examples of the organic solvent which can be used in the present invention include hydrocarbons (e.g. xylene, toluene, etc.), alcohols (e.g. methyl alcohol, n-butyl alcohol, isopropyl alcohol, 2-ethylhexyl alcohol, ethylene glycol, propylene glycol, etc.), ethers (e.g. ethylene glycol monoethyl ether, ethylene glycol monobutyl ether, ethylene glycol monohexyl ether, propylene glycol monoethyl ether, 3-methyl-3-methoxybutanol, diethylene gllycol monoethyl ether, diethylene glycol monobutyl ether), ketones (e.g. methyl isobutyl ketone, cyclohexanone, isophorone, acetylacetone), esters (e.g. ethylene glycol monoethylether acetate, ethylene glycol monobutylether acetate), and a mixture thereof. These solvent can be formulated in the cationic electrocoating composition in an amount of about 0.01 to 25 percent by weight, preferably 0.05 to 15 percent by weight, based on the total weight of the coating composition.

Another embodiment of the present invention provides a method for preventing cratering or cissing on an electrocoated film formed from the cationic electrocoating composition. The method comprises preparing an electrodeposition bath filled with the cationic electrocoating composition of the present invention, conducting electrocoating on an article to be coated and then baking it to cure.

For the present invention, the electrodeposition-painting is carried out in an electrodeposition bath under the condition conventionally conducted in the art, e.g. by perfectly immersing the article in the bath at a temperature of 20 to 40° C. for 30 seconds to 10 minutes with applying an electric potential of 50 to 500 volts. A thickness of the resulting electrocoating after baked is 5 to 50 μm, preferably 10 to 35 μm.

The baking process in the method of the present invention is generally carried out at a temperature of the article to be coated of 100 to 200° C., preferably 130 to 160° C., for 5 to 50 minutes. Most preferably the baking is carried out at 160° C. for 10 minutes.

The electrocoatings can be covered with and firmly adhered to any coatings such as PVC sealer, an intermediate coating or a top coating, etc.

Examples of the article to be coated with the cationic electrocoating composition include metal materials such as iron, copper, galvanized material, aluminum, or an alloy thereof. The metal materials selected therefrom may be subjected to chemical treatment prior to use.

EXAMPLES

The following Preparation Examples, Examples and Comparative Examples further illustrate the present invention in detail but are not to be construed as limiting the scope of the invention thereto. In Preparation Examples, Examples and Comparative Examples, the term "part" is based on weight unless otherwise stated.

Preparation Example 1

Preparation of a leveling agent (A)

1,000 Parts of butyl cellosolve was charged in a reaction vessel equipped with a stirrer, a thermometer, a decanter, a reflux condenser, a nitrogen introducing tube and a dropping funnel and heated to a temperature of 120° C. with introducing a nitrogen gas. To the content, a monomer mixture of 250 parts of 4-hydroxybutyl acrylate, 70 parts of 2-ethylhexyl methacrylate, 480 parts of n-butyl methacrylate, 100 parts of dimethylaminoethyl methacrylate and 90 parts of 2-methoxyethyl acrylate was added dropwise, and an aqueous solution of 13 parts of azo-bis-cyano valeric acid was simultaneously added dropwise thereto, both taking over 3 hours at a uniform dropping rate. On the completion of adding, the reaction continued at a temperature of 115° C. for further 3 hours. After 3 hours, the mixture was cooled to yield an acrylic resin having both a carboxyl group and an amino group in one molecule as the leveling agent (A). The acrylic resin had a nonvolatile content of 50% and a number average molecular weight of 5,000, an equivalent ratio of amino group: carboxyl group of 6.9:1, and a hydroxyl value of 97.1, an acid value of 5.2 and an amine value of 35.6.

Preparation Example 2 to 4 and Comparative Preparation Examples 1 to 3

Leveling agents (B), (C), (D), (E), (F) and (G) were prepared as generally described in Preparation Example 1, except that the monomers, initiators and amount thereof shown in Table 1 were used. The content of nonvolatile component, number average molecular weight, molar equivalent ratio of the amino and the carboxyl groups, hydroxyl value, acid value and amine value for each resulting leveling agent (B), (C), (D), (E), (F) or (G) are shown in Table 1, respectively.

TABLE 1

| | (Amount: part by weight) | | | | | | |
|---|---|---|---|---|---|---|---|
| | Preparation Examples | | | | Comparative Preparation Examples | | |
| Formulation | 1 | 2 | 3 | 4 | 1 | 2 | 3 |
| Leveling agent | (A) | (B) | (C) | (D) | (E) | (F) | (G) |
| Butyl cellosolve | 1,000 | 1,000 | 1,000 | 1,000 | 1,000 | 1,000 | 1,000 |
| Methacryllic acid | | 10 | | 10 | | | 40 |
| Acrylic acid | | | 10 | | | | |
| Methyl methacrylate | | | | 490 | 340 | 400 | |
| Lauryl methacrylate | | 80 | 150 | | | 120 | |
| 4-Hydroxybutyl acrylate | 250 | 250 | | 80 | | 120 | 240 |
| 2-Ethylhexyl methacrylate | 70 | | 60 | | | | 70 |
| n-Butyl acrylate | | 370 | | 420 | 250 | | 460 |
| n-Butyl methacrylate | 480 | | | | | | |
| Dimethylaminoethyl methacrylate | 100 | 190 | 50 | 310 | | 130 | 0 |
| 2-Methoxyethyl acrylate | 90 | 100 | 40 | | | 190 | 180 |
| 2-Hydroxyethyl methacrylate | | | 200 | 180 | 390 | | |
| Azo-bis-cyano valeric acid | 13 | 7 | 14 | 4 | 15 | | 7 |
| t-Butylperoxy-2-ethylhexanoate | | | | | | 32 | |
| Total content | 2,003 | 2,007 | 2,014 | 2,004 | 1,995 | 1,992 | 1,997 |

TABLE 1-continued

|  | (Amount: part by weight) | | | | | | |
|---|---|---|---|---|---|---|---|
|  | Preparation Examples | | | | Comparative Preparation Examples | | |
| Formulation | 1 | 2 | 3 | 4 | 1 | 2 | 3 |
| Non volatile component (%) | 50.1 | 50.2 | 50.3 | 50.1 | 49.9 | 49.8 | 49.9 |
| Number average molecular weight (× 10³) | 5 | 8 | 5.5 | 6.5 | 8 | 6 | 6 |
| Equivalent ratio of the amino and the carboxyl groups†) | 6.9 | 7.3 | 1.3 | 13.6 | 0.0 | 0.0 | 0 |
| Hydroxyl value | 97.1 | 96.7 | 85.1 | 108.4 | 169.1 | 47.1 | 93.8 |
| Acid value | 5.2 | 9.3 | 13.2 | 8.1 | 6.0 | 0.0 | 29.0 |
| Amine value | 35.6 | 67.4 | 17.6 | 110.3 | 0.0 | 46.8 | 0 |

†): It defines as an equivalent of amino group divided by of an equivalent of the carboxyl group.

Preparation Example 5
Preparation of a blocked isosyanate

92 Parts of 2,4-/2,6-tolylene diisocyanates (a weight ratio=8/2), 95 parts of methyl isobutyl ketone (hereinafter abbreviated to MIBK) and 0.5 parts of dibutyltin laurate were charged in a reaction vessel equipped with a stirrer, a cooler, a nitrogen introducing tube, a thermometer and a dropping funnel, and then 21 parts of methanol was added dropwise thereto with stirring. The reaction of the mixture started at room temperature, and thereafter, the temperature of the mixture rose to 60° C. due to exothermic reaction. After reacting for another 30 minutes, 57 parts of ethylene glycol mono-2-ethylhexyl ether was added dropwise, followed by adding 42 parts of an adduct of Bisphenol A-5 moles of propylene oxide. The reaction was conducted at a temperature of 60 to 65° C. until the absorption spectra based on the isocyanate group of the polyisocyanates substantially disappeared as examined using IR spectrum.

Preparation Example 6
Preparation of a base resin

365 Parts of an epoxy resin having an epoxy equivalent of 188, which was synthesized through the reaction of bisphenol A with epichrolohydrin, was added to the blocked isosyanate obtained in Preparation Example 5 and heated to 125° C. 1.0 Part of benzyldimethylamine was then added to the mixture and reacted at 130° C. until the epoxy equivalent reached to 410. Subsequently, 87 parts of bisphenol A was added to the reaction vessel and reacted at 120° C., and then, the epoxy equivalent increased to 1190. On the completion of the reaction, the mixture was cooled, and 11 parts of diethanolamine, 24 parts of N-methylethanolamine and 25 parts of aminoethylethanolamine ketiminate (79% by weight solution in MIBK) were added thereto and reacted at 110° C. for two hours. After 2 hours, the mixture was diluted with MIBK to 80% of a nonvolatile content to yield a base resin having a glass transition temperature of 22° C.

Preparation Example 7
Preparation of a crosslinking agent

723 Parts of isophorone diisocyanate, 333 parts of MIBK and 0.01 parts of dibutyltin laurate were charged in a reaction vessel equipped with a stirrer, a cooler, a nitrogen introducing tube, a thermometer and a dropping funnel and then heated to 70° C. After the mixture was homogeneously dissolved, 610 parts of methyl ethyl ketoxime was added dropwise thereto over two hours. After the addition, the reaction was continued at a reaction temperature, i.e. 70° C., until the absorption spectra based on an isocyanate group disappeared as examined using IR spectrum to yield a desirable crosslinking agent.

Preparation Example 8
Preparation of a pigment dispersing paste

To obtain a desirable pigment paste, 60.0 parts of a pigment dispersing resin varnish (quarterly ammonium salt-containing pigment dispersing epoxy resin) in an amount of a solid content, 2.0 parts of carbon black, 100.0 parts of kaoline, 80.0 parts of titanium dioxide, 18.0 parts of aluminum phosphomolybdate, and ion exchanged water were charged in a sand grind mill and dispersed to a particle size of not more than 10 µm. The ion exchanged water was charged in such an amount that the resulting pigment paste had a solid content of 56%.

Example 1

627.2 Parts of the base resin obtained in Preparation Example 6, 209.1 parts of the crosslinking agent obtained in Preparation Example 7 and 25.1 parts of the leveling agent (A) obtained in Preparation Example 1 in an amount of a solid content were homogeneously mixed, and then 3% by weight of ethylene glycol mono-2-ethylhexyl ether, % by weight being based on the solid content of the mixture, was added thereto. To the mixture, 2.09 parts of glacial acetic acid and 11.2 parts of formic acid were added to neutralize the mixture up to 41.7% of neutralization value, and thereafter, ion exchanged water was added to gradually dilute the mixture. After the addition, MIBK was vapoured away under a reduced pressure to obtain 36.0% of the solid content of the mixture to yield a main emulsion.

937.5 Parts of the resulting main emulsion, 266.4 parts of the pigment paste obtained in Preparation Example 8, 1249.2 parts of ion exchanged water and 1% by weight of butyltin oxide, % by weight being based on the solid content of the mixture, were mixed to produce a cationic electrocoating composition, having 20.0% by weight of the solid content.

The electrocoated film formed with the resulting cationic electrocoating composition was tested for (1) and (2) resistant to cissing and (3) adhesion with a top coating, according to the following procedure.

Test procedure:
(1) Test of resistant to cissing (determination of numbers of craters)

A test piece of a sample (a size of 7 cm by 15 cm) was horizontally fixed at a depth of 10 cm under an opening of the electrodeposition bath filled with the cationic electrocoating composition and stood still there for 5 minutes. Then, the piece was subjected to electrodeposition-painting in the bath at a temperature of 30° C. to give an electrocoated film having a dry thickness of 20 µm, washed with a water and left for 30 minutes, followed by baking it at 160° C. for 10 minutes. After baking, the appearance of the surface of the electrocoated film was observed by visually evaluation to count number of craters and then evaluated according to the following criteria.

Criteria:
the electrocoated film having 0 or 1 crater; good
the electrocoated film having 2 or more craters; bad
(2) Test of resistance to cissing (determination of cissing properties caused by oil)

An anticorrosive mechanical oil was mixed to the resulting electrocoating composition in an amount of 30 ppm and mixed for 48 hours. Then, a test piece (a size of 7 cm by 15 cm) was evaluated according to the same way as described in Test procedure (1), except that the test piece was positioned in the bath perpendicularly and subjected to electrodeposition-painting to have a dry thickness of 20 μm.

(3) Adhesion with a top coating

ORGASELECT 130 (alkyd resin top coat paint; available from NIPPON PAINT Co., LTD.) was coated on the electrocoated film formed in Test procedure (1), and the surface of the resulting film was cut with a paper cutter in a grid pattern having 100 grids sizing 2 square meters per a grid. An adhesive tape was applied to the grid patterned surface of the electrocoated film and then rapidly removed from the surface. Number of the residual grids on the electrocoated film was counted and evaluated according to the following criteria to determine adhering properties to the top coating.

Criteria:

95 to 100 grids stayed on the electrocoated film; good 0 to 95 grids stayed on the electrocoated film; bad The results of the above tests (1), (2) and (3) show in Table 2.

Examples 2 to 5 and Comparative Examples 1 to 3

Example 1 was repeated to produce the cationic electrocoating compositions, and thereafter, each resulting electrocoated film formed with the electrocoating compositions was subjected to the above tests (1) to (3), except that leveling agents (B), (C), (D), (E), (F) and (G) and amounts thereof as shown in the following Table 2 were employed. The results of the tests show in Table 2.

TABLE 2

|  | Example | | | | |
| --- | --- | --- | --- | --- | --- |
|  | 1 | 2 | 3 | 4 | 5 |
| Leveling agent | | | | | |
| Run | A | B | C | D | B |
| contents (parts by weigh) | 25.1 | 25.1 | 25.1 | 25.1 | 8.4 |
| (1) Resistant to cissing (number of craters) | good | good | good | good | good |
| (2) Resistant to cissing (cissing properties caused by oil) | good | good | good | good | good |
| (3) Adhesion with a top coating | 100/100 | 100/100 | 100/100 | 100/100 | 100/100 |

|  | Comparative Example | | |
| --- | --- | --- | --- |
|  | 1 | 2 | 3 |
| Leveling agent | | | |
| Run | E | F | G |
| contents (parts by weigh) | 25.1 | 25.1 | 25.1 |
| (1) Resistant to cissing (number of craters) | bad | bad | good |
| (2) Resistant to cissing (cissing properties caused by oil) | bad | good | bad |
| (3) Adhesion with a top coating | 50/100 | 50/100 | 50/100 |

Effect of the Invention

The electrocoated film formed with the electrocoating composition of the present invention has excellence characteristics such as good surface smoothness, increased resistance to crating or cissing, resistance to pinhole, good throwing power and workability, and improved adhesion properties with sealer coatings and top coatings to be coated thereon.

The electrocoating composition according to the present invention does not cause the environment pollution, when producing and/or wasting the composition after used because it is substantially free from lead compound.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A cationic electrocoating composition, comprising:
   (a) an acrylic resin functioning as a leveling agent, which has both an amino group and an acid group in one molecule and has a hydroxyl value of 50 to 200,
   (b) a base resin, and
   (c) a crosslinking agent,
   wherein the acrylic resin (a) is formulated in an amount of 0.1 to 20 percent by weight, based on the total weight of a mixture of the base resin (b) and the crosslinking agent (c), and the cationic electrocoating composition is substantially free from lead compound.

2. A cationic electrocoating composition, comprising:
   (a') an acrylic resin functioning as a leveling agent, which has both an amino group and an acid group in one molecule and has a hydroxyl value of 50 to 200, an amine value of 15 to 150 and an acid value of 5 to 15,
   (b) a base resin, and
   (c) a crosslinking agent,
   wherein the acrylic resin (a') is formulated in an amount of 0.1 to 20 percent by weight, based on the total weight of a mixture of the base resin (b) and the crosslinking agent (c), and the cationic electrocoating composition is substantially free from lead compound.

3. The cationic electrocoating composition according to claim 1 or 2, wherein the acrylic resin (a) or (a') has an amino group which is introduced by polymerizing an epoxy group-containing monomer and adding an amine.

4. The cationic electrocoating composition according to claim 1 or 2, wherein the acrylic resin (a) or (a') has an equivalent ratio of amino group: acid group of 1:1 to 30:1.

5. The cationic electrocoating composition according to claim 1 or 2, wherein the amino group is a primary amino, a secondary amino or a tertiary amino group.

6. The cationic electrocoating composition according to claim 1 or 2, wherein the amino group is introduced to the acrylic resin (a) or (a') from an acrylate monomer selected from the group consisting of N,N-dimethylaminoethyl methacrylate, N,N-diethylaminoethyl methacrylate, N,N-dimethylaminopropyl methacrylate and N,N-diethylaminopropyl methacrylate.

7. The cationic electrocoating composition according to claim 1 or 2, wherein the acid group is one selected from the group consisting of a carboxyl group, a phosphate group and a sulfonate group.

8. The cationic electrocoating composition according to claim 1 or 2, wherein the acid group is introduced into acrylic resin (a) or (a') from an initiator selected from the group consisting of 4,4'-azo-bis-4-cyanovaleric acid, dimetyl 2,2'-azo-bis-isobutyrate, t-butyl peroxymaleic acid and succinic peroxide; and/or a monomer selected from the group consisting of acrylic acid, methacrylic acid, phosphoric acid and sulfonic acid.

9. The cationic electrocoating composition according to claim 1 or 2, wherein the leveling agent (a) or (a') is contained in an amount of 1 to 5 percent by weight, based on the total weight of a mixture of an amino-modified epoxy resin functioning as the base resin (b) and a blocked polyisocyanate acting as the crosslinking agent (c).

10. The cationic electrocoating composition according to claim 1 or 2, wherein the amino-modified epoxy resin functioning as the base resin (b) is one which is obtained by modifying with an amine an epoxy resin selected from the group consisting of polyglycidyl ether of polyphenol, aliphatic polyol or alicyclic polyol.

11. The cationic electrocoating composition according to claim 1 or 2, wherein the amino group is introduced into the base resin (b) by reacting a secondary amine with the epoxy group before or after co-polymerizing the epoxy group-containing monomer.

12. The cationic electrocoating composition according to claim 1 or 2, wherein the blocked polyisocyanate acting as the crosslinking agent (c) is selected from the group consisting of an aliphatic polyisocyanate, an alicyclic polyisocyanate and a bicyclic polyisocyanate.

13. A method for preventing cratering or cissing on an electrocoated film formed from the cationic electrocoating composition according to any one of claims 1 to 12.

* * * * *